United States Patent Office 3,560,536
Patented Feb. 2, 1971

3,560,536
FRACTIONATION OF ALKALINE
EXTRACTS OF TREE BARKS
Edwin H. Gygi, Longview, and Donald F. Root, Bellevue, Wash., assignors to Weyerhaeuser Company, Tacoma, Wash., a corporation of Washington
Filed Apr. 10, 1967, Ser. No. 629,665
Int. Cl. C11b 13/00
U.S. Cl. 260—412                                6 Claims

ABSTRACT OF THE DISCLOSURE

A method of separating the aromatic and aliphatic acid salts contained in a water-immiscible alcohol phase of an aqueous alkaline extract of tree bark by washing the alcohol phase with water on a very dilute aqueous caustic solution and separating the aqueous and alcohol phases.

CROSS-REFERENCES

This application contains subject matter related to that found in U.S. Pats. Nos. 3,234,202 and 3,255,221 both assigned to the assignee of the present application.

BACKGROUND OF THE INVENTION

It is known that the barks of trees contain wax products useful in various commercial applications such as the manufacture of floor waxes, polishes, coating agents, moisture proofing agents and the like. The waxes present in the bark, however, are admixed with a great number of other chemical substances of diverse properties and character which substantially degrade the properties and commercial value of the wax components. The fractionation and separation of these wax components from the barks of trees has been attempted by several different methods, hitherto known. For example, see U.S. Pats. Nos. 2,562,607; 2,662,893; and Canadian Pat. No. 520,376 of Kurth, wherein processes are described for the recover of wax and other chemicals from the barks of trees. Also the work of Zenczak, disclosed in U.S. Pats. Nos. 2,781,336, and 2,891,046 is of interest. In U.S. Pats. Nos. 3,234,202 and 3,255,221, are also described processes for the fractionation and recovery of wax components from the alkaline extracts of tree barks. All of these prior art methods have been deficient in certain respects in that they have not achieved a degree of fractionation and separation desired for upgrading the wax products to a commercially satisfactory standard. For example, after solvent extraction with a water-immiscible alcohol of an aqueous alkaline extract of tree bark as described in either U.S. Pats. Nos. 3,234,202 or 3,255,221, the waxy components contained in the solvent phase still contain amounts of nonwaxy components which substantially affect the properties of the waxes. These nonwaxy phenolic materials are difficult to remove from the waxy components in a way applicable to commercial purposes. This invention has for its primary purpose the separation of these nonwaxy components from the waxy components in a way which is efficient, economical and readily adaptable to commercial purposes.

SUMMARY

In its broadest aspects, the process of this invention involves the separation of long chain aliphatic and aromatic acid components contained in a water-immiscible alcohol phase by the simple step of washing the alcohol phase with water for a time sufficient to effect separation of the two general classes of compounds. The process of this invention is applicable to the separation of aromatic and aliphatic acid constituents derived from any source, and is not necessarily limited to the separation of these components derived from extracts of tree barks. However, the invention is particularly applicable to the separation of the aromatic and aliphatic acid constituents contained in a water-immiscible alcohol phase of alkaline extracts of tree barks. Further separation of respective constituents of the aliphatic portion of the organic solvent extracts may be achieved by the appropriate further processing as herein described.

DETAILED DESCRIPTION

The alkaline extract of the barks of trees contains a complex mixture of organic chemicals which may be classified into four general types:

(1) Wax fraction—composed primarily of salts of long chain fatty acids hydroxy fatty acids, phenolic fatty acid esters; neutrals, such as long chain alcohols, neutral esters of fatty acids, and sterols.

(2) Fusible phenolic fraction—contains low molecular weight salts of monomeric and polymeric phenolic acids and fatty acid esters of phenolic or polyphenolic acids, the fraction characterized by being substantially completely fusible below the temperature of 160° C.;

(3) Infusible phenolic fraction—contains the higher molecular weight salts of polyphenolic acids characterized by decomposition temperatures of from about 275° to 300° C.;

(4) Acid-soluble phenolic fraction—contains tannin and tannin-like materials plus small amounts of carbohydrate.

The process of this invention is applicable to whole bark or any of the several mechanical bark fractions such as cork, powder, or others. It is applicable to the treatment of bark from various coniferous and deciduous species of trees, as follows:

Coniferous:
    Douglas fir (*Pseudotsuga taxifolia*)
    White fir (*Abies concolor*)
    Grand fir (*Abies grandis*)
    Ponderosa pine (*Pinus ponderosa*)
    Lodgepole pine (*Pinus contorta*)
    Short leaf pine (*Pinus chinata*)
    Loblolly pine (*Pinus sitchensis*)
    Sitka spruce (*Picea sitchensis*)
    Western hemlock (*Tsuga heterophylla*)
    Western red cedar (*Thuja plicata*)
    Redwood (*Sequoia sempervirens*)

Deciduous:
    Alder (*Alnus rubra*)
    Red gum (*Liquidamber sytraciflua*)
    Yellow birth (*Betula lutea*)

The bark of Douglas fir is preferred because of its high wax content. The process of this invention is also applicable to the separation of aromatic and aliphatic acids derived from petrochemicals or other sources than the barks of trees.

The invention can be best described by reference to the accompanying drawings in which.

The water-immiscible alcohol phase of the aqueous alkaline extract of barks of trees contains varying amounts of wax fraction and a fusible phenolics fraction, as those terms have been described previously. The alcohol phase may be obtained by a process such as described in U.S. Patent No. 3,255,221 of Dowd et al., or U.S. Patent No. 3,234,202 of Brink et al., which patents are assigned to the assignee of the present application and hereby incorporated by reference.

In a typical procedure, the alkaline bark extract is prepared by reducing the bark to a particle size such that a major portion passes an 8 mesh screen but is retained on an 80 mesh screen (U.S. Sieve Series). The bark then is fed to an extraction cell wherein it is subjected to the action of an aqueous alkaline solution for a time predetermined to dissolve the alkaline soluble content of the bark.

The alkaline solution may be prepared from a basic acting compound of an alkali metal or ammonia, preferably caustic soda, sodium carbonate, or caustic potash, in an amount ranging from 5 to 25% of the dry weight of the bark, preferably 10 to 16% in the case of caustic soda. The ratio of bark to aqueous media is also controlled to produce an alkaline extract having an organic solids concentration of from 5 to 25%.

The extraction is carried out at a temperature between ambient temperature and the boiling point of the cell contents at atmospheric pressure, or at a higher temperature if superatmospheric pressures are employed. Reaction time may vary from 10 to 180 minutes, perferably from 30 to 90 minutes.

Upon completion of reaction, the aqueous alkaline slurry is passed through a seperator where the bark residue solids are separated from the extract. The bark fines carried with the extract then are removed, preferably by centrifuging, and the fines-free liquid alkaline extract then is ready for subsequent treatment in accordance with the present invention.

Figure 1:
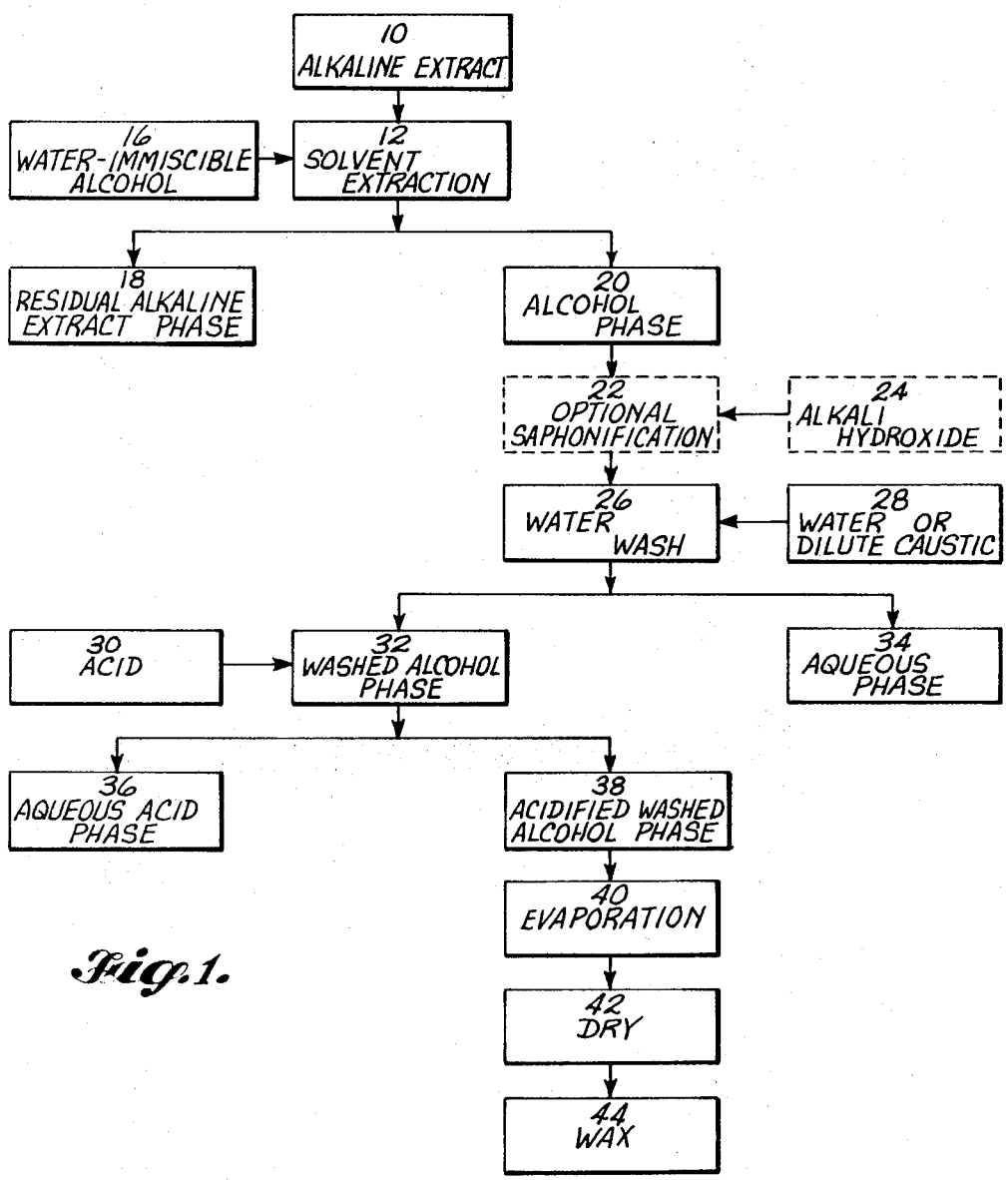
FIG. 1 is a flow diagram illustrating a process embodying certain of the features of the present invention.

For separating and recovering the wax and fusible phenolics fraction of the aqueous alkaline extract, reference is now made to FIG. 1 wherein the alkaline extract 10 is subjected to solvent extraction at 12 for separating and recovering the wax and fusible phenolics fraction of the aqueous alkaline extract. Although various types of extraction are suitable for this purpose, a mixer-centrifuge extractor is employed in the embodiment illustrated in FIG. 1. The solvent 16 is a water-immiscible alcohol having from 4–12 carbon atoms, such as n-decyl alcohol, 5-ethyl 2-nonanol, dodecyl alcohol, benzyl alcohol and 2-ethyl 1,3 hexanediol. Alcohols which are especially suitable comprise the water-insoluble butyl, amyl, hexyl, heptyl and octyl alcohols. They may be used singly or in admixture with each other.

It is preferred to employ commercially available products such as the mixture of amyl alcohols sold under the trade name of "Pentasol" and comprising a mixture of amyl alcohols principally the three isomeric primary amyl alcohols derived from the oxidation of mixed pentanes.

The alcohols of the foregoing classes may be monohydric or polyhydric in character and may have straight chain or branch chain structures. However, if alcohols having fewer than 4 carbon atoms are employed, their solubility in water becomes so complete that phase separation becomes impossible. Also, the use of alcohols having more than 12 carbon atoms per molecule is attended by slowness in establishing solvent-solute equilibrium and by difficulties created by the low volatility of the alcohol in distilling the alcohol from the wax.

In carrying out the treatment any desirable ratio of alcohol to alkaline extract may be employed. A suitable range of ratios is from 0.25–1 part by volume of alcohol to each part by volume of extract. However, this ratio may be modified in particular applications, as determined by the character of the extract, the identity of the alcohol and the other conditions of treatment.

Since the waxy substances are appreciably soluble in the alcohol, even at the freezing temperature of the mixture, the treatment may be effectuated at a low temperature, if desired. However, it is preferred to carry it out at an elevated temperature at or near the boiling point of the system, a preferred range being between 50° C. and the system boiling point. At elevated temperatures the equilibrium between solvent and solute is established rapidly so that a treating time of only a few minutes is required.

The alkaline extract should have a pH of at least 6, and preferably of 8–12, for extraction with the water-immiscible alcohol. It has been determined, for example, that a contact time of ten minutes at 70°–80° C. for each stage provides substantially complete extraction of the wax and fusible acid phenolics using an amount of mixed amyl alcohols equivalent to 25% of the weight of the alkaline extract.

The treatment with alcohol may be carried out in any suitable type of equipment, either batchwise or continuously, using as many applications of alcohol as desirable or necessary to separate the waxy components of the alkaline extract. Provision should be made in the apparatus for mixing the components of the system adequately, as well as for establishing and maintaining the desired treatment temperature. Pressure equipment may be employed where it is desired to carry out the treatment at temperatures above the normal boiling point of the system.

After the treatment has been completed, the alcohol phase 20 is separated from the residual alkaline extract phase 18 in a suitable manner, as by gravity settling or centrifuging. It contains dissolved and dispersed long chain alcohols and sterols, as well as the salts of various higher fatty acids, hydroxy fatty acids, neutral esters of fatty acids, and phenolic fatty acid esters.

The extraction of wax components of barks of trees by the above process is distinctly different than that disclosed in the Zenczak patents wherein an alcoholic alkaline extractant is used. According to the process disclosed by Zenczak, the salts of the wax fraction are put into solution but the phenolics remain with the cellulosic residue, whereas in the process of this invention the salts of both the wax and the fusible phenolics fraction appear in the aqueous-alkaline solution. In addition, a water-immiscible alcohol is used in the present invention.

The alcohol phase 20 can be optionally subjected to saponification 22 using an alkali metal hydroxide 24, such as sodium hydroxide. By saponifying the mixture contained in the alcohol phase 20 the ester components, comprising salts of phenolic fatty acid esters and neutral esters of fatty acids, are broken apart. Preceding the saponification step, the alcohol phase, which contains a small amount of water, may be dried by evaporation and concentrated, thereby facilitating the saponification reaction. The amount of alkali metal hydroxide required to saponify the components in the alcohol phase 20 is that amount required to saponify the acid ester components making up the mixture. Generally an amount ranging from 1 to 5 times the amount required to satisfy the ester content of the mixture should be used. The temperature of saponification is not critical and may range from about 50 to 100° C. under normal pressure conditions. The time required for saponification can be easily determined by one skilled in the art, and is dependent upon concentration, amount of caustic used, amount of water in the system, and temperature.

To effect separation of the aromatic components contained in the alcohol phase 20 from the waxy components, the alcohol phase 20 or, in the case of saponification, the saponification mixture 22, is subjected to a water wash 26. If the alcohol phase 20 is not first saponified it is preferably washed with a dilute aqueous caustic solution (0.1 N NaOH). It is surprising that the aromatics present as their salts in the alcohol phase 20 can be separated from salts of aliphatic acids present in the wax fraction by a simple water wash. This is due to the unique property of the water-immiscible alcohol used of selectively dissolving in preference to water the salts of the long chain fatty acids and hydroxy fatty acids contained in the wax fraction of the alkaline extract even though they are present in the form of their alkaline salts. In carrying out the water wash 1 part water or dilute caustic (0.1 N NaOH) to 3–10 parts alcohol extract is preferably used. It is preferred to carry out the water wash at elevated temperatures, that is from about 50° C. up to the boiling point of the system. Any suitable type of equipment, for example, pulse column, packed column, or mixer-centrifuge may be used. Atmospheric or superatmospheric pressures may be used. The time of contact may vary from a few seconds when using a mixer-centrifuge to several minutes when using a pulse column.

The aqueous phase 34 from the water wash contains predominantly the fusible phenolics fraction, particularly the dark colored aromatic constituents of the alcohol extract, such as the alkali metal salts of complex phenolic materials which, when mixed with the wax components, are deleterious to obtaining a product which is commercially valuable.

The washed water-immiscible alcohol phase 32 is then subjected to further processing to refine the wax components therein.

In FIG. 1, the washed water-immiscible alcohol phase 32 is acidified from a source 30 with a strong organic or mineral acid to convert the soluble alkaline salts of the wax to the insoluble free acid form. This requires acidification to a pH of not more than about 4.0, preferably about 3.0. The acidification steps may be carried out with hydrochloric, phosphoric, sulfurous, or acetic acid, but preferably sulfuric acid is used. Although acid strength is not critical, it should be high enough to avoid excessive dilution and low enough, preferably not more than 50%, to prevent localized overheating.

The aqueous acid phase 36, containing excess acid and alkali metal salts of the acid used for acidification, is separated from the alcohol phase 32 by suitable means and the washed and acidified water-immiscible alcohol phase 38, containing the wax components, is then recovered by any suitable means, such as shown, i.e. by evaporation of the organic solvent 40 followed by a drying operation 42 to remove any traces of water or solvent remaining in the wax 44. Wax obtained according to FIG. 1 without saponification is designated as Wax A while, with saponification, it is designated as Wax B.

Figure 2:
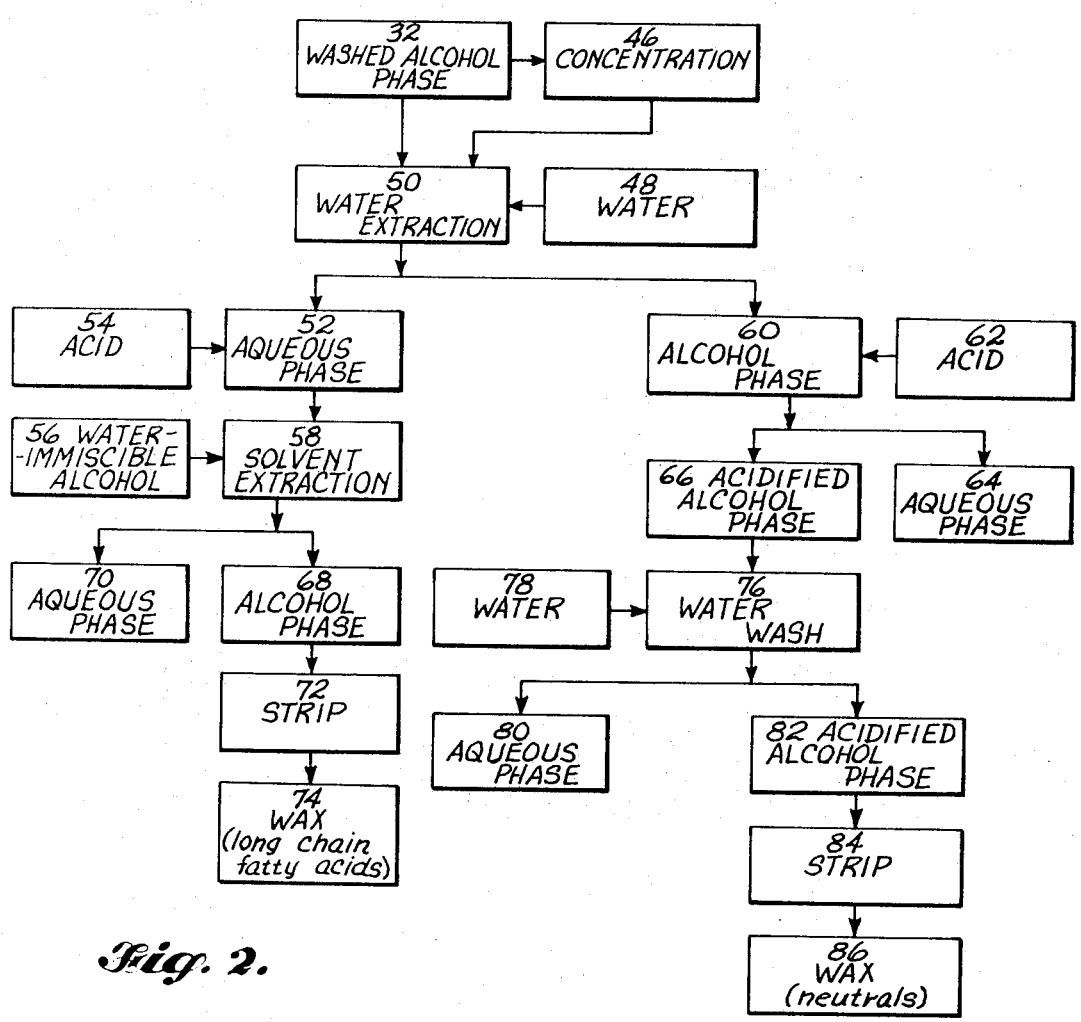
FIG. 2 is a diagram illustrating a process embodying modifications of the process for treatment of the water washed water-immiscible alcohol phase.

FIG. 2 denotes a modified process for the separation of the wax components contained in the water-washed water-immiscible alcohol phase 32. This modification is valuable for separation of the neutrals fraction in the wax mixture from the long chain fatty acids fraction. The wax fraction present in the alcohol phase 32 is preferably concentrated to about 30–40% by weight at 46. The alcohol phase 32 is then subjected to countercurrent water extraction 50 using water from source 48. This extraction is to be distinguished from the water wash 26 in that a greater amount of water is employed, that is, 3 to 10 parts by weight of water per part of alcohol phase, whereas in the water wash, the ratio of water to the alcohol phase is much lower. The other conditions of the extraction, i.e. temperature, pressure, time of contact, may be the same as those used in the water wash 26. It is preferred that the water used not contain any free acidity. To ensure this condition a very dilute caustic solution (0.01 NaOH) may be used.

The aqueous phase 52 containing the alkali metal salts of long chain fatty acids is acidified from a source 54 with a strong acid selected from one of the acids mentioned previously in connection with the acidification of the washed alcohol phase 32. Conditions similar to those mentioned previously can be employed.

The acidified aqueous phase 42, containing the free acid form of the wax, now is subjected to solvent extraction at 58 using alcohols and conditions previously mentioned in connection with solvent extraction step 12. The aqueous phase 70 and the alcohol phase 68 are separated following the solvent extraction 58. The aqueous phase contains excess acid, the salt of the acid used for acidification, and small amounts of organics. The alcohol phase 68, containing the free acid form of the wax 74 may be further steam stripped at 72 to separate the solvent therefrom.

The water-immiscible alcohol phase 60, containing the neutrals fraction, is also acidified from a source 62 using conditions previously described in connection with the acidification of alcohol phase 32. The acidification step is employed at this point to liberate any residual acid salts remaining in the neutrals fraction. The aqueous acidic phase 64, containing excess acid and salts of the acid used, is discarded. The acidified alcohol phase containing the neutrals fraction and small amounts of fatty acids is further washed at 76, the aqueous phase 80 and alcohol phase 82 separated and the alcohol phase 82 steam stripped at 84 to separate the solvent from the neutrals fraction 86.

From the foregoing it is apparent that the present invention offers a variety of procedures by which the separation of the wax components contained in the alkaline extract of tree barks can be effected. The procedural steps and production equipment are uncomplicated, thus accommodating large scale production at minimum cost. Raw materials recovery is achieved efficiently and economically, thus contributing further to economic production.

The following examples, illustrating the various processing methods discussed herein, are not intended to be limiting in any manner. Unless otherwise designated, references are to parts by weight.

Example I

This example represents processing according to FIG. 1 without saponification of the components contained in the water-immiscible alcohol phase 20.

An aqueous alkaline extract prepared from whole Douglas fir bark and containing a mixture of organic chemicals including a wax fraction, a fusible phenolics fraction, an infusible phenolics fraction, and an acid solubles fraction, prepared as described in U.S. Patents Nos. 3,255,211 and 3,234,202, 159.0 parts by weight, was fed to a continuous single stage mixer-extractor followed by a centrifugal phase separator along with 181.6 parts by weight of a water saturated mixture of the isomers of amyl alcohol. The temperature of the mixed-centrifuge extractor was about 165° F. After a residence time of approximately 4 minutes in the mixer-extractor the alcohol extract containing the wax fraction and fusible phenolics fraction was separated from the aqueous phase in the centrifugal phase separator and fed to a pulse washing column operated at 150° F. into which was also fed 27.7 parts by weight of a dilute caustic solution (0.1 N sodium hydroxide). The aqueous phase withdrawn from the pulse column contained the sodium salts of aromatic acids. The washed alcohol extract was removed from the pulse column and contacted with 340 parts of a 6.44 N solution of sulfuric acid to liberate the acid salts in the extract. The acidified washed alcohol extract was separated from the aqueous acid wash which contained excess sulfuric acid and sodium sulfate along with small amounts of organics. The wax in the alcohol phase was recovered by steam stripping of the alcohol solvent followed by removal of the water content in the wax. The wax, identified as Wax A, contained long chain fatty acids and neutrals, was a tan color and had the following properties:

| | |
|---|---|
| Melting point, ° C. | 52 to 54 |
| Penetration | 6 |
| Saponification No. | 186 |
| Acid No. | 102 |
| Iodine No. | 11.8 |
| Ester No. | 84 |

Example II

A caustic extract having a composition as described in Example 1 was processed in accordance with Example 1 with the exception that the alcohol extract of the aqueous caustic extractant was saponified prior to washing with water with a 50% sodium hydroxide solution. The recovered wax, identified as Wax B, was light brown in color and had the following properties:

| | |
|---|---|
| Melting point, °C | 58 to 65 |
| Penetration | 7 |
| Saponification No. | 150 |
| Acid No. | 54 |
| Iodine No. | 12.5 |
| Ester No. | 96 |

Example III

An aqueous caustic extract of Douglas fir bark having a composition similar to that of Example I, 124.5 parts by weight, was fed to a single stage mixer-extractor along with 100.5 parts by weight of a water saturated mixture of the isomers of amyl alcohol, the components added simultaneously. The temperature in the mixer-extractor was about 165° F. After a residence period of approximately 4 minutes, the alcohol extract containing wax and fusible phenolics was separated from the aqueous phase in the centrifugal phase separator and fed to a pulse washing column operated at 150° F. into which was also fed 32.5 parts by weight of a dilute caustic soda solution (0.1 N sodium hydroxide). The aqueous phase withdrawn from the pulse column contained the sodium salts of aromatic acids characterized as in Example I. The washed alcohol extract was removed from the pulse column and the components therein concentrated and dried. The wax components were then passed into a continuous water extraction column wherein they were contracted with 52.7 parts by weight of a dilute caustic soda solution (0.001 N sodium hydroxide to effect a separation of the neutrals and fatty acid components of the wax mixture. The aqueous and organic phases were separated and each contacted with a solution of 6.44 N sulfuric acid to liberate the acid salts contained therein. The molten wax from the aqueous phase was further washed and the solution was removed leaving a brown wax, identified as Wax C, having the following properties:

| | |
|---|---|
| Melting point, °C | 62 to 64 |
| Penetration | |
| Saponification No. | 183 |
| Acid No. | 158 |
| Iodine No. | 12.8 |
| Ester No. | 25 |

The alcohol phase, acidified with sulfuric acid, was separated from the aqueous phase containing excess sulfuric acid and sodium sulfate and washed with water at 170° F. to separate any remaining acid or sodium sulfate from the solvent mixture. The alcohol phase was then steam stripped to remove the solvent and a tan wax, identified as Wax D, was recovered having the following properties:

| | |
|---|---|
| Melting point, °C | 57 to 59 |
| Penetration | 13 |
| Saponification No. | 150 |
| Acid No. | 67 |
| Iodine No. | 7.5 |
| Ester No. | 83 |

Example IV

A caustic extract having a composition as described in Example I was processed in accordance with Example III with the exception that the alcohol extract of the aqueous caustic extractant was saponified prior to washing with water with a 50% sodium hydroxide solution. A neutrals fraction and an acid fraction, identified as Wax E and Wax F, were recovered and had the following properties:

| | Wax E, tan | Wax F, light tan |
|---|---|---|
| Melting point, °C | 64–66 | 62–64 |
| Penetration | 8 | 7 |
| Saponification No. | 31.3 | 162 |
| Acid No. | 17.6 | 141 |
| Iodine No. | 6.9 | 14.1 |
| Ester No. | 12.7 | <1 |

Example V

The following examples serve to illustrate the use of the process of this invention in effecting separation of mixed amyl alcohol solutions of alkali metal salts of aromatic and aliphatic acids using a simple water wash, the acids derived from sources other than the barks of trees.

A mixture of three parts of stearic acid to one part benzoic acid was dissolved with a slight excess (1.1 times the stoichiometric amount required for neutralizing the acid) of sodium hydroxide in a mixture of wet isomers of amyl alcohol and the alcohol phase washed with stirring with a 0.05 N sodium hydroxide solution at 180° F. for about 5 minutes. The aqueous and organic partition coefficients calculated on the basis of the analyses, were as follows:

$K$=less than 0.1—stearic acid
$K$=approximately 15—benzoic acid indicating that substantially all of the stearic acid was accounted for in the alcohol phase and substantially all of the benzoic acid in the aqueous phase.

A similar experiment was performed using stearic acid and salicylic acid with the following results:

$K$=0.07—stearic acid
$K$=11.0—salicylic acid

It will be apparent to those skilled in the art that various modifications may be made in the process steps and conditions described above without departing from the spirit of this invention and the scope of the appended claims.

Having now described our invention, we claim:

1. Process of separating alkali metal salts of a mixture of aromatic and aliphatic acids obtained from an aqueous alkaline extract of tree bark by extraction of said aqueous alaline extract with a water-immiscible alcohol having from four to twelve carbon atoms, the mixture of salts being contained in the water-immiscible alcohol phase, consisting of the steps of
    (1) washing the water-immiscible alcohol phase with water at a temperature ranging from 50° C. up to the boiling point of the system, the amount of water used being that necessary to effect separation of the alkali metal salts of the aromatic acids from the alkali metal salts of the aliphatic acid;
    (2) then allowing the alcohol and aqueous phases to separate, the alcohol phase containing substantially all of the aliphatic alkali metal salts and the aqueous phase containing substantially all of the aromatic alkali metal salts; and
    (3) then separating the aqueous phase from the alcohol phase.

2. The process according to claim 1 wherein the aqueous alkaline extract of tree bark is an aqueous caustic soda extract of the bark of Douglas fir and wherein the alcohol phase is washed with one part by weight of water to 3–10 parts by weight of said alcohol.

3. The process of separating the alkali metal salts of a mixture of aromatic and aliphatic acids obtained from an aqueous caustic soda extract of Douglas fir bark extracted with an isomeric mixture of primary amyl alcohols, the mixture of acid salts contained in said amyl alcohol phase, consisting of the steps of (1) washing the water-immiscible amyl alcohol phase with one part by weight of water to 3–10 parts by weight amyl alcohol at a temperature ranging from 50° C. up to the boiling point of the system;

(2) then allowing the alcohol and aqueous phases to separate, the alcohol phase containing substantially all the aliphatic alkali metal salts and the aqueous phase containing substantially all of the aromatic alkali metal salts; and (3) then separating the aqueous phase from the alcohol phase.

4. Process according to claim 1 wherein the aliphatic alkali metal salts contained in the washed and separated alcohol phase of step (3) of claim 12 are further refined to produce a wax fraction containing substantially no aromatic constituents and composed principally of long chain fatty acids and long chain alcohols by (a) acidifying the washed and separated water-immiscible alcohol phase to a pH of not more than 4.0 with an aqueous acidic solution wherein the acid is one selected from the group consisting of hydrochloric, phosphoric, sulfurous, acetic and sulfuric acids, to convert the aliphatic alakli metal salts to their corresponding aliphatic acids;

(b) separating the immiscible aqueous and alcohol phases; and (c) separating from the alcohol phase the long chain aliphatic acids and the long chain alcohols carried therein.

5. Process according to claim 1 wherein the aliphatic alkali metal salts contained in the washed and separated water-immiscible alcohol phase of step (3) of claim 1 are further refined to separate a neutrals fraction containing principally long chain alcohols, nectral esters of fatty acids, and sterols by (a) extracting said washed and separated water-immiscible alcohol phase with three to ten parts by weight water per one part of alcohol phase at a temperature ranging from 50° C. up to the boiling point of the system to form an aqueous phase containing substantially all of the alkali metal salts of the long chain fatty acids and an alcohol phase containing substantially all of said neutrals fraction; and (b) separating the immiscible aqueous and alcohol phases.

6. Process according to claim 1 including, prior to step (1) of claim 1, the step of saponifying the mixture contained in the water-immiscible alcohol phase to cleave the ester components contained therein.

References Cited

UNITED STATES PATENTS

| | | | |
|---|---|---|---|
| 2,159,397 | 5/1939 | Mills | 260—415 |
| 2,367,050 | 1/1945 | Price et al. | 260—413 |
| 2,506,473 | 5/1950 | Steinberger | 260—415X |
| 2,662,893 | 12/1953 | Kurth | 260—412.8X |
| 2,781,336 | 2/1957 | Zenczak | 260—124 |
| 2,880,216 | 3/1959 | Burgon et al. | 260—412X |
| 2,891,046 | 6/1959 | Burgon et al. | 260—124 |
| 2,947,764 | 8/1960 | Zenczak | 260—413X |
| 3,234,202 | 2/1966 | Brink et al. | 260—413X |
| 3,255,221 | 6/1966 | Dowd et al. | 260—412.5 |

HOWARD T. MARS, Primary Examiner

U.S. Cl. X.R.

260—412.5, 412.8, 413, 415

PO-1050
(5/69)

UNITED STATES PATENT OFFICE
CERTIFICATE OF CORRECTION

Patent No. 3,560,536          Dated February 2, 1971

Inventor(s) EDWIN H. GYGI ET AL

It is certified that error appears in the above-identified patent and that said Letters Patent are hereby corrected as shown below:

In column 1, line 16, "on" should read --or--;

in column 1, line 40, "recover" should read --recovery--;

in column 2, line 9, "extracts" should read --extract--;

in column 2, line 18, "long chain fatty acids" should read --long chain fatty acids,--;

in column 2, line 45, "chinata)" should read --echinata)--;

in column 2, line 46, "(Pinus sitchensis)" should read --(Pinus taeda)--;

in column 3, line 31, "seperator" should read --separator--;

in column 3, line 58, "classes" should read --class--;

in column 6, line 48, "mixed-centrifuge" should read --mixer-centrifuge--;

in column 8, line 48, "alaline" should read --alkaline--;

in column 9, line 14, "claim 12" should read --claim 1--;

in column 9, line 23, "alakli" should read --alkali--; and in column 9, line 34, "nectral" should read --neutral--.

Signed and sealed this 6th day of July 1971.

(SEAL)
Attest:

EDWARD M. FLETCHER, JR.
Attesting Officer

WILLIAM E. SCHUYLER, JR.
Commissioner of Patents